March 16, 1932. B. KIRSCH 1,849,934
AUTOMOTIVE HEATER
Filed Aug. 10, 1931 2 Sheets-Sheet 2

Benjamin Kirsch,
Inventor.
Delos & Haynes,
Attorney.

Patented Mar. 15, 1932

1,849,934

UNITED STATES PATENT OFFICE

BENJAMIN KIRSCH, OF CHICAGO, ILLINOIS, ASSIGNOR TO AUTO RADIATOR MANUFACTURING CO., OF CHICAGO, ILLINOIS, A CORPORATION OF ILLINOIS

AUTOMOTIVE HEATER

Application filed August 10, 1931. Serial No. 556,163.

This invention relates to heaters, and with regards to certain more specific features to automotive heaters for motor cars and the like.

Among the several objects of the invention may be noted that provision of an automotive heater of improved, compact construction including an improved arrangement of water and air circulating ducts; the provision of a heater of the class described which is entirely safe in operation; and the provision of such a heater which shall comprise a minimum number of parts adapted to be quickly assembled into a rugged unit adapted to be easily applied to a vehicle. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated one of various possible embodiments of the invention, Fig. 1 is a side elevation of the assembled apparatus, parts being broken away for clarity;

Fig. 3 is a cross section taken on line 3—3 of Fig. 2; and,

Fig. 4 is a reduced end elevation of the cover of the heating radiator, taken from the left in Fig. 1; parts being removed.

Similar reference characters indicate corresponding parts throughout the several views of the drawings.

Figure 1:
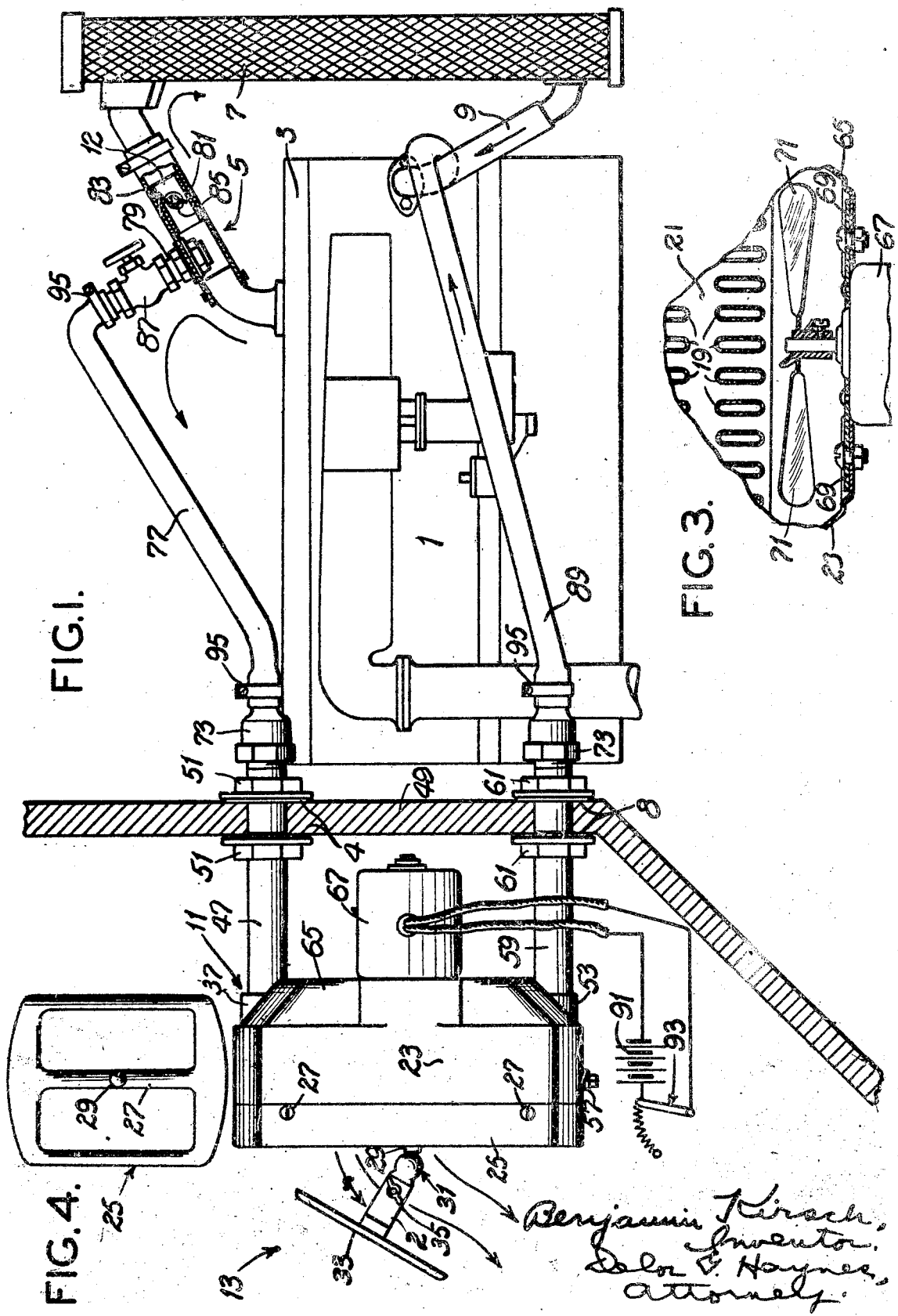
Figure 2:
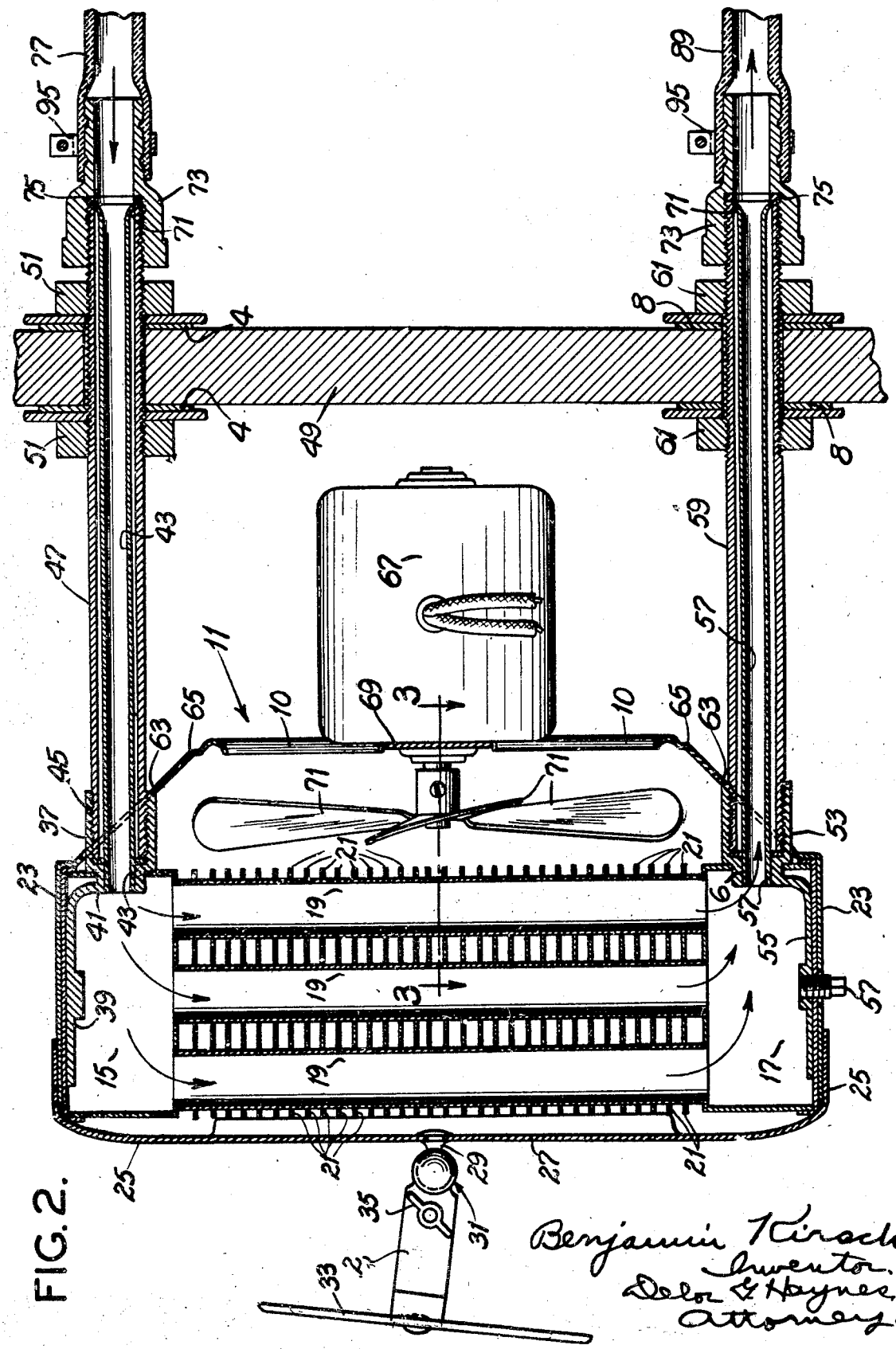
Fig. 2 is an enlarged longitudinal section of a heating unit and connections therefor.

Referring now more particularly to Fig. 1, there is shown at numeral 1 an automotive engine for driving a motor vehicle. This engine 1 includes a water circulating jacket 3 normally used for purposes of cooling said engine 1. The jacket 3 has a connection 5 with the ordinary automotive cooling radiator 7 and a return connection 9. Thus operation of the engine 1 results in a circulation of heated water from the jacket 3, through the connection 5, through the cooling radiator 7 and back to the jacket 3 by way of the return connection 9.

The present invention refers to a heating radiator connected into said water circulating system so that heat which might otherwise be uselessly dissipated may, in cold weather, be used for heating purposes in the tonneau of the vehicle.

Numeral 11 refers broadly to the heating unit in the tonneau 13. The tonneau compartment of the vehicle is entirely separated from the engine compartment so that obnoxious engine gases and heat do not pass to the tonneau compartment. This unit 11 comprises an upper header 15 and a lower header 17 connected by relatively flat water tubes 19. These tubes 19 are relatively flat in the fore and aft direction as shown in Fig. 3 and are surrounded by a series of horizontally disposed radiating fins 21. These fins conduct heat from hot water in the tubes 19, from whence the heat is swept away by convection of air passing between the fins 21. The parts 19 and 21 comprise a circulating core. The headers 15 and 17, tubes 19 and fins 21 form a simple, rigid, unitary structure.

Over the headers 15, 17 and surrounding the tubes 19 and fins 21 is slidably fitted a sheath 23, preferably composed of a sheet metal stamping which is applied over the rear of the headers 15, 17 and heat transfer devices 19, 21. Over the front of said elements 15, 17, 19 and 21 is positioned a front cover 25 which telescopes over the edge of and is held to the sheath 23. The front cover 25 and sheath 23 are held together by screws 27.

As shown by Fig. 4, the cover 25 has a central bridge portion 27 which carries a ball 29 of a ball-and-socket joint 31. The socket member 2 of the joint 31 carries a deflector 33 and is provided with a thumb nut 35 for clamping and holding a predetermined relationship between the parts of the joint 31. It will be understood that the member 2 is split and positioned over the ball 29, the thumb nut acting with its bolt to tighten and loosen the split portion.

Attached to the upper header 15 is a boss 37 having a soldered internal extension brace 39. In the boss 37, and shown at numeral 41, is a bore adapted to receive and have soldered therein a copper water-carrying pipe 43. The boss 37 is counter-bored and threaded as shown at numeral 45 to threadably receive an exterior stanchion 47, the latter passing through the dash board 49 of the motor vehicle and being held by clamp nuts 51 acting against cushioning pads 4 of rubber or the like.

The lower header 17 is provided with a boss 53 similar to the boss 37 and having an internal soldered supporting extension 55. The latter is bored and centered to receive a threaded plug 57 serving drainage purposes. The boss 53 is provided with an outlet pipe 57 soldered in a bore 6 and an external stanchion 59 passing through said dash board 49 and being provided with clamping nuts 61 with pads 8.

The bosses 37 and 53 pass through openings 63 in a rearward funnel shaped extension 65 of the sheath 23.

In order to force air through the heating radiator 11, there is provided a motor 67 on the extension 65, this being done by means of a cross bracket 69. The rearward extension 65 of the sheath 23 is solid, except for the holes 63 which are traversed by the bosses 37 and 53. In the enclosed portion of the extension 65 are located the fan blades 71 of the motor 67. The periphery 10 of the opening 65 is arranged to be located inside of the tip circle of the fan blades 71 thus insuring complete safety so far as the rotating fan is concerned and insuring that all air drawn through the opening at the rear of the extension 65 shall be directed through the radiator without loss due to air being thrown centrifugally.

The stanchions 47 and 59 extend through the dash board 49. These support the radiator 11. The internal copper pipes 43 and 57 do not brace or support the radiator but function as water carriers. It is therefore possible to solder them in their respective bosses and swage them outwardly at the other end as shown at numeral 71. The copper pipes 43, 57 need not be particularly straight because they are hidden and this is an advantage inasmuch as this class of pipe is usually bent and warped in manipulating it. Over the ends of the stanchions 47 and 59 are threaded nipples 73. Over the ends the pipes 57, 59 and 43, 47 respectively are located washers 75 for the purpose of preventing leakage of water between these respective sets of pipes 57, 59 and 43, 47. I have found that the iron pipe of which pipes 47 and 59 are composed is strong and well adapted to bracing and holding purposes and that if I relieve it of water-carrying duty, that the threads may be coarsely made so as to serve purposes of strength primarily, rather than water-tightness. The pipes 43 and 57 which are relieved of supporting duty can readily be made water-tight by means of the gaskets 75 and of the soldering at the ends in the bosses 37 and 53. Thus, by relegating one function to the interior pipes 43, 57 and another to the exterior stanchions 47, 59, I obtain an excellent, leak-proof and rigid structure at low cost.

Attached to the upper nipple 73 is a rubber hose 77 which preferably passes to a connection 79 in the hose 5 between the cooling radiator 7 and engine 3. The connection 79 is made below a cylindrical thermostat 81 which has been previously inserted into said hose 5. The thermostat 81 is of known design comprising in the cylinder 12 thereof a rotatable cut-off valve 83 under control of a bi-metallic spiral member 85. When the circulating water attains a predetermined temperature, the bi-metallic spiral 85 changes its form so as to move the valve 83 to a position to open the passage to the cooling radiator 7. Thus when the engine 1 is started, the valve 83 is closed and substantially all of the circulating water is delivered to the heating radiator 11 and hence full advantage is taken of what little heat there is in the water at this time. When the temperature rises the valve 83 opens gradually and automatically to supply the cooling radiator 7 with water. Thus a maximum rate of the action of the heating radiator 11 is insured. A valve 87 permits of cutting off the heating radiator 11 in the warm season.

The lower nipple 73 is connected by means of a rubber hose 89 to the return connection 9 of the radiator 7. Thus it will be seen that there is parallel circulation set up between the engine 1 as a source and the cooling radiator 7 on the one hand and the heating radiator 11 on the other hand. The radiators 7 and 11 deliver returns by way of pipes 9 and 89 respectively. The resulting circulation I refer to as being in a parallel circuit as distinct from a series arrangement of the radiators 7 and 11.

As shown in Fig. 1, the fan motor 67 is wired to the battery 91 and in circuit with the rheostatic controller 93, whereby the speed of the motor may be varied.

Among the advantages of the invention may be noted the provision of a parallel circulation wherein only one of the legs of the system connected with the cooling radiator is provided with a thermostatic control, this control being closed at the start of operation of the engine. Thus the natural circulation of the water is at first all through the radiator 11 which insures quick heating in the tonneau of the car. At the same time overheating of the engine 1 is not incurred, because the valve 83 automatically opens to permit the cooling radiator 7 to come into effect when the cooling effect of the heating radiator 11 is not enough.

Another advantage is that of the pipe construction wherein the pipes 43 and 57 have water circulating functions only, and the stanchions 47 and 59 have supporting functions only.

The arrangements of the nipple 73 permits of attaching the hoses 77 and 89 with maximum grip by means of clamps 95 and at the same time the use of the improved pipe and stanchion arrangement.

The location of the fan blades 71 well within the extension 65 and having the tips thereof completely surrounded by said extension results in a completely enclosed and safe fan which is more efficient in that it prevents loss of air radially.

Another advantage is the use of automotive type of water tubes 19 with the fins 21. This has a great advantage over the use of a water chamber having air tubes therethrough in that a higher coefficient of heat transfer is effected.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In an automotive heater, a heating unit, at least one supporting stanchion for supporting said unit and a water-carrying pipe within said stanchion but relieved by said stanchion of supporting functions.

2. In an automotive heater, a heating unit, at least one supporting stanchion for supporting said unit and a water-carrying pipe within said stanchion but relieved by said stanchion of supporting functions and means for preventing passage of water between the interior pipe and said stanchion, whereby the stanchion need not be made water-tight.

3. In an automotive heater, a heating unit, a boss extending therefrom, a stanchion attached to said boss and adapted to be fastened to the dash board of the vehicle to which the heater is applied, said stanchion supporting the heater, and an interior pipe in said stanchion sealed to said boss but relieved of supporting functions.

4. In an automotive heater, a heating unit, a boss extending therefrom, a stanchion attached to said boss and adapted to be fastened to the vehicle to which the heater is applied, said stanchion supporting the heater, an interior pipe in said stanchion sealed to said boss at one end and relieved of supporting functions by the stanchion, and means for sealing the space at the other end between the pipe and the stanchion.

5. In an automotive heater for a vehicle, a heating unit, a boss extending therefrom, a stanchion attached to said boss and adapted to be fastened to the dash of said vehicle to which the heater is applied, said stanchion supporting the heater, an interior pipe in said stanchion sealed to said boss at one end but relieved of supporting functions by the stanchion, means for sealing the space at the other end between the pipe and stanchion, and a nipple attached to the stanchion adapted to hold said last-named sealing means in place and to receive a supply pipe.

In testimony whereof I have signed my name to this specification this 7th day of August, 1931.

BENJAMIN KIRSCH.

DISCLAIMER

1,849,934.—*Benjamin Kirsch*, Chicago, Ill. AUTOMOTIVE HEATER. Patent dated March 15, 1932. Disclaimer filed September 1, 1934, by assignee, *Auto Radiator Manufacturing Company*.

Hereby enters this disclaimer to that part of the claim in said specification which is in the following words, to wit:

"1. In an automotive heater, a heating unit, at least one supporting stanchion for supporting said unit and a water-carrying pipe within said stanchion but relieved by said stanchion of supporting functions.

"2. In an automotive heater, a heating unit, at least one supporting stanchion for supporting said unit and a water-carrying pipe within said stanchion but relieved by said stanchion of supporting functions and means for preventing passage of water between the interior pipe and said stanchion, whereby the stanchion need not be made water-tight.

"3. In an automotive heater, a heating unit, a boss extending therefrom, a stanchion attached to said boss and adapted to be fastened to the dash board of the vehicle to which the heater is applied, said stanchion supporting the heater, and an interior pipe in said stanchion sealed to said boss but relieved of supporting functions."

[*Official Gazette October 2, 1934.*]